3,115,629
REPETITIVE SIGNAL SYSTEMS FOR IMPROVING SIGNAL TO NOISE RATIO

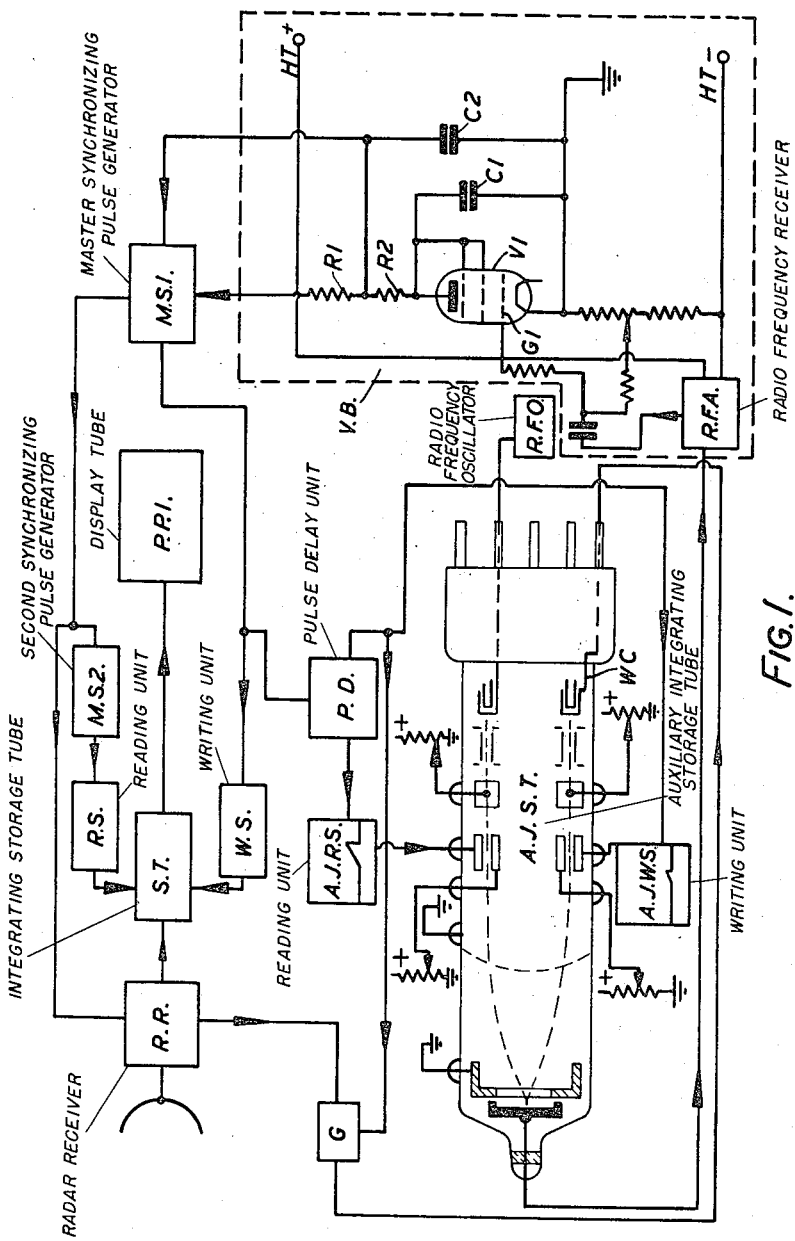
FIG. I.

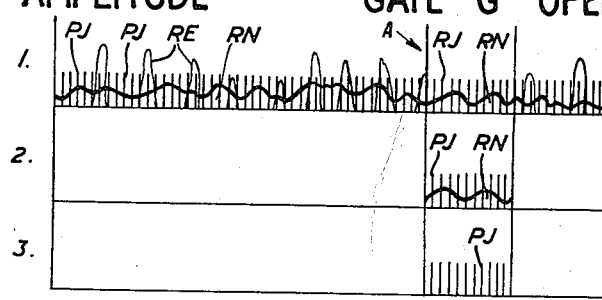
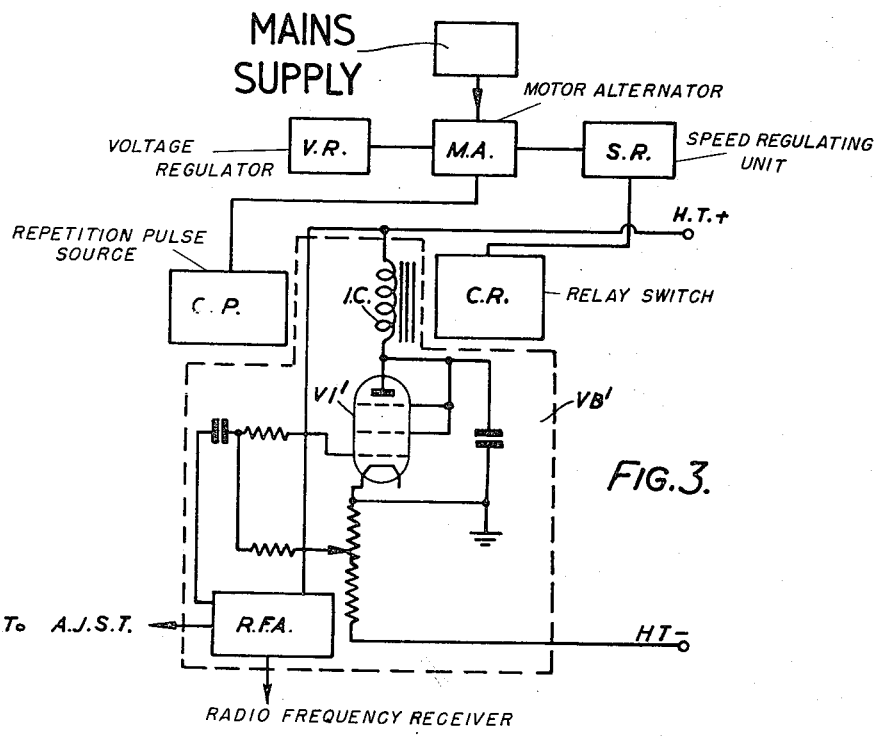

Donald Leopold Plaistowe and Reginald Peter Brash, Chelmsford, England, assignors to The Marconi Company Limited, London, England, a British company
Filed Feb. 17, 1958, Ser. No. 715,686
Claims priority, application Great Britain Mar. 1, 1957
4 Claims. (Cl. 343—17.1)

This invention relates to periodically repetitive signal receiving systems, i.e. to signal systems employing pulses or other signals which are repeated at a given repetition frequency. The main, though not the exclusive application of the invention is to pulsed radar systems wherein of course, pulses are transmitted and echo pulses are received at a given pulse repetition frequency. The invention is, however, applicable to all systems in which pulses or similar signals are transmitted and received at a given frequency e.g. certain facsimile telegraph systems. The object of the invention is to receive or reduce interference by signals—usually deliberate jamming signals—whose frequency is the same as, or is a multiple or sub-mutilple of the repetition frequency used. In the description which follows the invention will be described with reference to its principal application i.e. to pulsed radar systems.

The signal to noise ratio in the receiver portion of a pulsed radar can be substantially improved by using an electronic storage tube to store a succession of echo signals, the stored signals being taken off at periodical intervals. Our British patent No. 812,635, issued April 29, 1959, described radar systems in which this is done. Here video signals together with interfering signals accompanying them are applied to a storage tube fed from a radar receiver, in order to clear video signals of noise before they are applied to the display tube of the P.P.I. Although random noise signals may be substantially eliminated in this way, periodic jamming signals such as those from sources such as other radar installations or enemy jamming devices may nevertheless be passed on to the P.P.I. display tube at levels such as to interfere with the clear display of the required signals. This effect is most pronounced when the periodic jamming signals occur at a frequency which is synchronously related to the scanning frequency of the storage tube deflection circuits employed, interference with the intelligence displayed by the P.P.I. tube reaching its maximum where the periodic jamming signal frequency is a multiple or sub-multiple of said scanning frequency. When this happens the effect of the interference is at a sharp maximum, becoming much less with quite a small change in the frequency of said jamming signals relative to said scanning frequency.

It is in general either impracticable or impossible to change the pulse repetition frequency of a jamming station in order to avoid the above deleterious effects, but in some radar systems, it is possible to change the frequency of the normally provided master synchronising signal generator and thus of all its related synchronising and delayed pulses, including the pulses controlling the display tube scanning frequency. In some radar systems a manual control for this purpose is fitted on the P.P.I. tube consol or other convenient place. The present invention provides means whereby the pulse repetition frequency of a radar system is altered automatically to avoid the above described conditions under which the jamming interference level is high enough seriously to impair the display of intelligence by the P.P.I. display tube or other indicating device.

According to the present invention a radar or other periodically repetitive signal system comprises means for producing a control signal dependent upon received interfering signals in integral relationship with the repetition frequency of the system at any given moment and received at instants of time other than those at which the useful signals are received, and means automatically actuated by said control signal for changing said pulse repetition frequency to abolish said relationship. In this specification the repetition frequency of the system and the interfering signal repetition frequency are said to be in integral relationship when one is equal to or is a multiple or a sub-multiple of the other.

The most important application of this invention is, as stated, to radar systems of the pulse type. In order that the pulse repetition frequency of such a system may be automatically changed in a reliable manner the said periodic jamming or other interfering signals should be separated both from received radar pulses and from random interference before they are utilised to produce the control signal. In carrying out the present invention in its preferred embodiments, therefore, there are provided means for taking samples of separated interfering signals occurring in quiescent periods of the radar system, that it to say during times when no echo signals are being received; means for clearing said jamming signals of random interferences; and means for using the resultant separated cleared signals to produce a control signal for acting upon the pulse repetition frequency of the radar system. Preferably an auxiliary storage tube—which, as will be seen later, need have only a relatively small number of storage elements and which can be quite small and relatively cheap in which a cathode ray is caused to scan a mosaic of storage elements in integral relationship with the pulse repetition frequency of the radar system is used to store interfering signals occurring during times other than those at which useful echo signals occur, the stored signals are taken off periodically by scanning the storage elements at a frequency lower than that used for scanning during storing, and the stored signals taken off are used, preferably after amplitude limiting, to produce a control signal controlling the master synchronizing generator of the radar system.

The amplitude limiting is such as to limit the stored signals taken off to an amplitude substantially equal to that of the weakest jamming signals that it is desired to utilise for control. Preferably also, in order to prevent undesired variations of the pulse repetition frequency of the radar system a pre-determined fixed controlling voltage component is applied to said master generator so that, in the absence of jamming signals producing a control voltage, the repetition frequency of said master generator will be of a predetermined chosen value.

The invention is illustrated in the accompanying drawings in which FIG. 1 is a simplified diagram of a radar system embodying the invention; FIG. 2 is an explanatory graphical figure; and FIG. 3 is a simplified diagram showing part of a modification.

Referring now to FIG. 1, this shows a radar receiver R.R. of any suitable known type, feeding into an echo signal integrating storage tube S.T. which is scanned by "writing" sweeps from a scanning unit W.S. and "reading" sweeps from a scanning unit R.S., the scanning unit W.S. is synchronized by a first master synchronizing pulse generator M.S.1 which determines the transmitted pulse frequency in the usual way. The scanning unit RS is synchronized by a second pulse generator MS2 controlled by the generator MS1 and operating at a sub-harmonic of the repetition frequency of MS1 e.g. 1/10 of that frequency. The frequency of the generator MS1 is controlled by a variable bias voltage fed to it via a time constant circuit comprising resistors R1 and R2 and condensers C1 and C2, from an integrating valve. The storage tube ST is used to improve the signal-noise ratio. Since the storage tube arrangement forms per se no part of the present invention it will not be further described herein.

The receiver RR feeds into an auxiliary storage integrator tube AJST. A radio frequency oscillator circuit RFO feeds radio frequency to that cathode of the tube used for the "reading" cathode ray beam (the upper beam in the figure). A pulse delay unit PD is interposed between the pulse generator MS1 on the one hand and the reading and writing sweep AJRS and AJWS of the tube AJST on the other, and serves to apply pulses from the generator MS1 to synchronize said units of which AJWS may operate at the frequency of MS1 and AJRS at 1/10 of that frequency (for example). The said sweep units are such and the delay is such that the scanning sweeps of said units occur only during the quiescent periods between received echo pulses.

The pulse delay unit PD also operates a gating device G said device being arranged in manner known per se to pass received signals from the receiver RR to the writing cathode W.C. of the storage tube AJST only during said quiescent periods. The auxiliary storage tube AJST need have only a relatively small number of mosaic elements (e.g. 300 in a single line) and may therefore be relatively cheap and of conveniently small physical size. It will be seen that only jamming or interfering signals which are of a repetition frequency in integral relationship with that of the Radar system will build up substantial charges upon the mosaic elements of the auxiliary tube subsequently to be read off by the reading sweep, so that such signals are enhanced in value relative to other signals and said tube in effect samples this sort of interference only.

The output from the tube AJST, taken from the mosaic electrode back plate by the reading cathode ray, is a carrier (from the oscillator RFO) modulated by the stored signals and this is fed to a radio frequency receiver RFA which is biased to limit the passed amplitudes to that of the weakest amplitude it is desired to utilize for controlling the pulse repetition frequency of the radar system. The output from unit RFA is fed to the control grid G1 of an amplitude limiting valve V1 whose anode circuit contains the time constant circuit R1, R2, C1, C2 so that said valve acts as integrator limiter. As will be seen valve V1 supplies a frequency controlling bias to the generator MS1 so that, if there is more than a predetermined strength of modulation of the carrier from RFA the frequency of MD1 will be altered.

FIG. 2 at line 1 shows in terms of amplitude and time, periodic jamming signals PJ mixed with random noise signals RN and radar echo signals RE, which may be received by receiver RR of FIGURE 1 during the active periods of the system. Column A represents a quiescent period when the transmitter is switched off and no echo signals can therefore be present. The gate G is "open" during this time line 2 of FIG. 2 shows the jamming and noise signals as passed on to the auxiliary storage tube AJST of FIG. 1 i.e. when gate G is open. Line 3 shows the cleared limited jamming signals as applied to the control grid C1 of the valve V1.

In those radar systems of the type in which the master synchronising signals are derived directly from an alternating current mains supply it is impracticable to alter the frequency of the supply and FIG. 2 shows, so far as is necessary to understand its differences from FIG. 1, graphs of the operation of an embodiment which is suitable for such systems.

In this embodiment the radar system is provided with a variable bias control unit, which is supplied with cleared samples of jamming signals as in FIG. 1 and which is arranged to control the speed regulating device of a motor alternator which supplies power for the radar system and from which the pulse repetition frequency of the system is derived and which is provided with an automatic voltage regulating device (as known per se) for keeping its voltage constant when its speed is changed.

Referring now to FIG. 3 the arrangement therein shown differs from that of FIG. 1 mainly by the substitution of the control unit shown in the broken outline VB' for that shown in the outline VB of FIG. 1. This control unit includes a relay coil 1C connected in the anode lead of the integrating valve V1' (corresponding to the valve V1 of FIG. 1) and which operates any suitable convenient relay switch, represented merely by the block CR, and connected, when actuated, to change the voltage supplied by a speed regulator unit SR to the motor portion of a motor alternator MA the alternator portion of which is controlled in known manner by a voltage regulator VR so that the alternator always gives constant output amplitude. As will be seen, when the relay system is actuated the frequency from the alternator is changed. The output of the alternator is converted to the repetition pulses of the radar system by any known arrangement represented by the block CP.

We claim:

1. A pulse radar system comprising means for transmitting periodically repetitive pulsed signals, a master synchronizing generator arranged to control the repetition frequency of said pulse signals in accordance with the frequency of said master generator, receiving means, an auxiliary storage tube having a mosaic of storage elements and fed from said receiving means, means for scanning said mosaic with a cathode ray at a frequency in integral relationship with the pulse repetition frequency of the transmitted signals during quiescent periods, when the transmitter is switched off and no echo signals can be present to store interfering signals received during said periods, means for taking off the stored signals including means for scanning the mosaic with a cathode ray at a frequency lower than that used for scanning during storing, means fed with the taken off stored signals for producing a control signal, and means responsive to said control signal for controlling the frequency of the master synchronizing generator.

2. A radar system as claimed in claim 1 including means for limiting the amplitude of said taken off stored signals to a value substantially equal to that of the weakest interfering signals which it is desired to utilize for control and wherein said limiting means is interposed between said means for taking off stored signals and the means for producing a control signal.

3. A periodically repetitive signal system comprising means for transmitting periodically repetitive signals, receiving means, means for storing and subsequently reading out signals received during quiescent periods when the transmitter is switched off and no echo signals can be present, in such manner that read-out signals whose repetition frequency is in integral relationship with the repetition frequency of the transmitted signals are enhanced in value relative to the other signals, means for producing a control signal dependent on the level of said read-out signals and means, automatically actuated by said control signal, for changing the repetition frequency of said transmitted signals to abolish said relationship.

4. A pulsed radar system comprising means for transmitting periodically repetitive pulsed signals, receiving means, means for storing and subsequently reading out signals received during quiescent periods when the transmitter is switched off and no echo signals can be present, in such manner that read-out signals whose repetition frequency is in integral relationship with the pulse repetition frequency of the transmitted signals are enhanced in value relative to the other signals, means for producing a control signal dependent on the level of said read-out signals and means, automatically actuated by said control signal, for changing the pulse repetition frequency of said transmitted signals to abolish said relationship.

References Cited in the file of this patent

UNITED STATES PATENTS

| | | |
|---|---|---|
| 2,869,119 | Frederick | Jan. 13, 1959 |
| 2,943,316 | Covely | June 28, 1960 |